United States Patent
Mizushima

(10) Patent No.: US 7,263,971 B2
(45) Date of Patent: Sep. 4, 2007

(54) KNOCKING CONTROL DEVICE FOR WATERCRAFT ENGINE

(75) Inventor: Yoshihiro Mizushima, Shizuoka-ken (JP)

(73) Assignee: Yamaha Marine Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 11/237,033

(22) Filed: Sep. 28, 2005

(65) Prior Publication Data

US 2006/0137654 A1    Jun. 29, 2006

Related U.S. Application Data

(63) Continuation of application No. PCT/JP2004/019614, filed on Dec. 28, 2004.

(51) Int. Cl.
*F02P 5/00*     (2006.01)
*F02D 41/00*    (2006.01)

(52) U.S. Cl. .............................. 123/406.33; 123/406.52

(58) Field of Classification Search ........... 123/339.11, 123/406.21, 406.29, 406.33, 406.34, 406.37, 123/406.52
See application file for complete search history.

(56) References Cited

U.S. PATENT DOCUMENTS 4,903,663 A * 2/1990 Ooki et al. ............ 123/406.32
5,038,736 A * 8/1991 Ohkumo et al. ....... 123/406.33
6,371,076 B1 * 4/2002 Kamijo et al. .............. 123/295
2005/0268886 A1 * 12/2005 Etou et al. ............. 123/406.29

FOREIGN PATENT DOCUMENTS

| JP | 2003-139034 | 5/2003 |
| JP | 2004-162656 | 6/2004 |
| JP | 2004-353473 | 12/2004 |
| KR | 2004003826 | * 1/2004 |

OTHER PUBLICATIONS

International Search Report for Application No. PCT/JP2004/019614 (the PCT counterpart of the current application) mailed Feb. 1, 2005.

* cited by examiner

*Primary Examiner*—Hai Huynh
(74) *Attorney, Agent, or Firm*—Knobbe, Martens, Olson & Bear, LLP

(57) ABSTRACT

A knocking control device for a watercraft engine includes a knocking learning value renewing section for changing a knocking learning value toward a low octane number ignition timing map when the knock sensor detects a knocking condition. The device changes the knocking learning value toward a high octane number ignition timing map when the knock sensor does not detect a knocking condition. An ignition timing determining section retards or advances an ignition timing based upon the knocking learning value given from the knocking learning value renewing section. The knocking learning value renewing section is constructed not to change the knocking learning value toward the high octane number ignition timing map, when an engine speed is in the vicinity of a full throttle condition.

19 Claims, 7 Drawing Sheets

$$\text{Ignition timing} = \underbrace{\left(\begin{array}{c}\text{high octane}\\\text{number ignition}\\\text{timing map}\\\text{(3-D map of}\\\text{engine speed-}\\\text{intake}\\\text{pressure)}\end{array}\right) \times \begin{array}{c}\text{knocking}\\\text{learning}\\\text{value}\end{array} + \left(\begin{array}{c}\text{low octane}\\\text{number ignition}\\\text{timing map}\\\text{(3-D map of}\\\text{engine speed-}\\\text{intake}\\\text{pressure)}\end{array}\right) \times \begin{array}{c}(1 - \text{knocking}\\\text{learning}\\\text{value})\end{array}}_{} + \begin{array}{c}\text{knocking}\\\text{adjusting}\\\text{angle}\end{array}$$

*Figure 5*

KNOCKING CONTROL DEVICE FOR WATERCRAFT ENGINE

PRIORITY INFORMATION

This application is a continuation of International Application PCT/JP2004/019614, with an international filing date of Dec. 28, 2004, the entire contents of which are expressly incorporated by reference herein.

BACKGROUND OF THE INVENTION

1. Field of the Invention

This invention relates to a knocking control device, and, more particularly, to a knocking control device for a watercraft engine.

2. Description of the Related Art

A knocking control device for an automobile engine is described in JP-A-2001-082242. This knocking control device is equipped with a control function to determine whether the fuel has a high octane number or a low octane number from a signal of a knock sensor. This is done even though the engine, which is specified for high octane number gasoline, is supplied with regular gasoline. The device is also provided with a knocking learning control routine under which an ignition timing map for the high octane number and another ignition timing map for the low octane number are complementarily mixed at a certain rate with each other to determine ignition timing. A coefficient of the rate for the complemental mixing is called a knocking learning value.

SUMMARY OF THE INVENTION

If the knocking control device of JP-A-2001-082242 for an automobile engine is applied to a watercraft engine, it would change the knocking learning value even in the full throttle operation of the engine. Because a watercraft unlike an automobile is often run in a full throttle operation (approximately 6,000 rpm), the knocking control device would cause the engine speed to greatly fluctuate in the full throttle operation.

Therefore, an advantage of the present invention is to solve the problem described above, to provide a knocking control device for a watercraft engine that can prevent knocking (hereunder, can be replaced by "knock") from occurring, and/or can stabilize an engine speed to improve operational comfort.

Accordingly, one embodiment of the present invention comprises a knocking control device for a watercraft engine comprises a knock sensor configured to detect knocking in the engine. A knocking learning value renewing section is configured to change a knocking learning value toward a low octane number ignition timing map when the knock sensor detects knocking, and to change the knocking learning value toward a high octane number ignition timing map when the knock sensor does not detect a knocking. An ignition timing determining section is configured to retard or advance an ignition timing based upon the knocking learning value given from the knocking learning value renewing section. The knocking learning value renewing section is configured not to change the knocking learning value toward the high octane number ignition timing map when an engine speed is in the vicinity of a full throttle condition.

Another embodiment of the present invention comprises a method for controlling knocking in a watercraft engine. In the method, knocking in the engine is detected. A knocking learning value is changed toward a low octane number ignition timing map when knocking is detected. When knocking is not detected, the knocking learning value is changed toward a high octane number ignition timing map if an engine speed is not in the vicinity of a full throttle condition. When knocking is not detected, the knocking learning value is maintained towards the low octane number ignition timing map if the engine speed is in the vicinity of the full throttle condition. Ignition timing is retarded or advanced based upon the knocking learning value.

Certain objects and advantages of the invention have been described above for the purpose of describing the invention and the advantages achieved over the prior art. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

BRIEF DESCRIPTION OF THE DRAWINGS

A general architecture that implements various features of specific embodiments of the invention will now be described with reference to the drawing. The drawing and the associated descriptions are provided to illustrate embodiments of the invention and not to limit the scope of the invention.

FIG. 5 is an illustration showing an embodiment of an equation used for determining ignition timing.

DETAILED DESCRIPTION OF THE PREFERRED EMBODIMENTS

An embodiment of this invention is described with reference to FIGS. 1–7.

Figure 1:
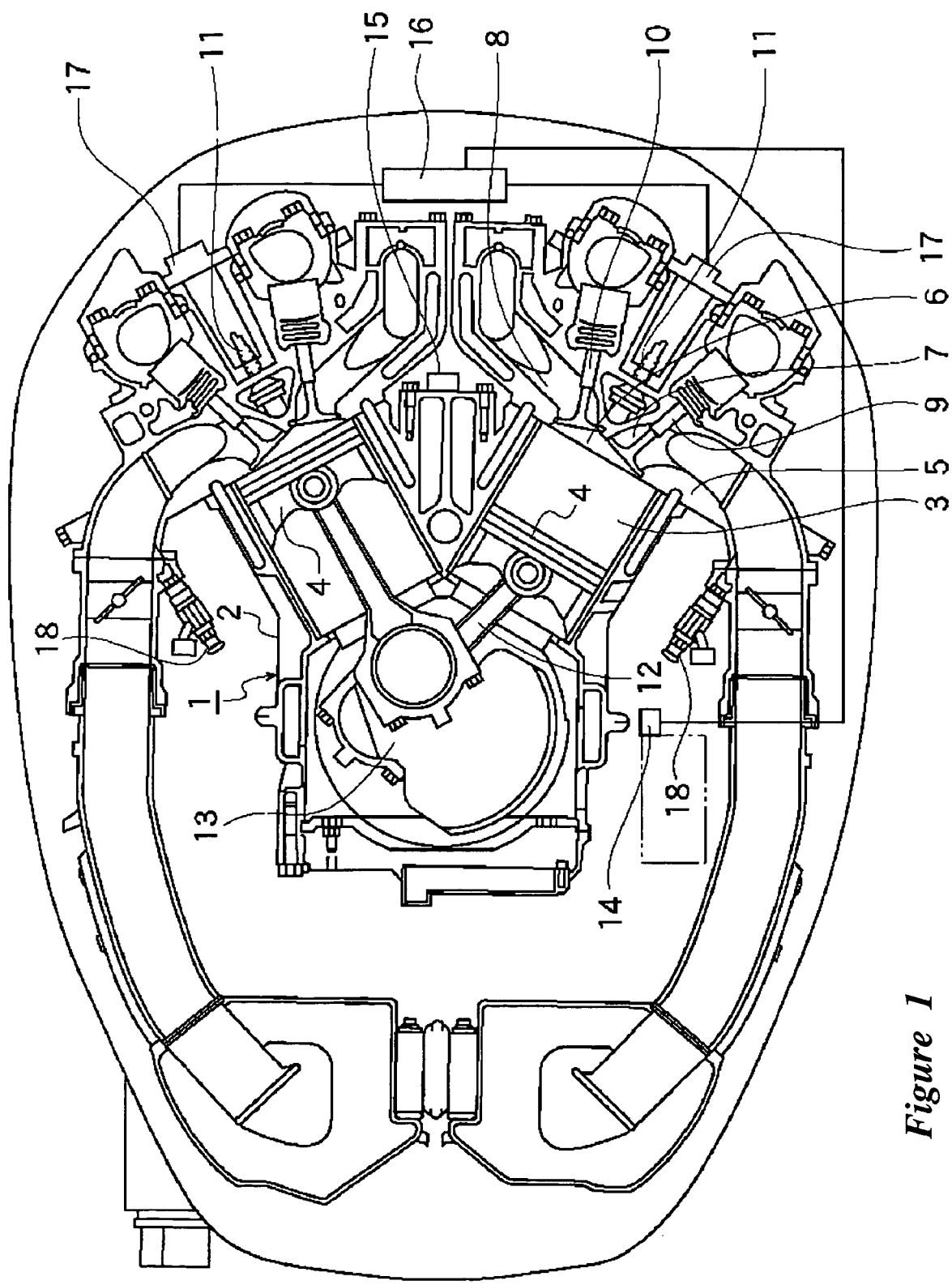
FIG. 1 is a schematic top plane view of a watercraft engine according to an embodiment of this invention.

FIG. 1 is a schematic top plan view of an illustrated embodiment of an engine 1, which can be used with the knocking control device described below. In the illustrated embodiment, the engine 1 comprises a cylinder block 2 that defines cylinder bores 3. Inside of each cylinder bore 3 is reciprocally disposed a piston 4, which is connected to a crankshaft 13 via a connecting rod 12. A top surface of the piston 4, an inner surface of the cylinder bore 3 and a recessed portion of a cylinder head 5 fixed to the cylinder block 2 together form a combustion chamber 6.

Each cylinder head 5 has an intake port 7 and an exhaust port 8, which both open toward the combustion chamber 6. The intake port 7 and the exhaust port 8 have an intake valve 9 and an exhaust valve 10, respectively. Further, each cylinder head 5 has an ignition or spark plug 11, which can be positioned generally in a center of the recessed portion.

In the cylinder head 5, an intake conduit that defines an intake passage is coupled with an upstream portion of the intake port 7, while an exhaust conduit that defines an exhaust passage is coupled with an upstream portion of the exhaust port 8.

The engine 1 has a crank angle sensor 14 that detects the rotation of the crankshaft 13 (i.e., engine speed), and a vibration sensor 15 that detects a knocking condition of the engine as will be described below.

It should also be appreciated that the engine 1 is an exemplary embodiment of a watercraft engine that can be used with the knocking control device described below. That is, various features, aspects and advantages of the present invent may be used with engines having more than one intake valve and/or exhaust valve, and any of a variety of configurations including a variety of numbers of cylinders and cylinder arrangements (V, W, opposing, etc.).

In the illustrated embodiment, the signals from these sensors 14, 15 and other sensors (not illustrated) are transmitted to an ECM (engine control module) 16. The ECM 16 preferably has a central processing unit (CPU) and some storage units which store various control maps defining relationships between parameters (e.g., ignition timing and knocking). The ECM 16 then controls the spark plug 11, the fuel injectors 18 and other actuators based upon these inputted signals. The ECM 16 is configures such that ignition signals are outputted to an igniter 17 connected to the plugs 11 from the ECM 16, and also injection signals are outputted to the injectors 18 so that the ignition timings, fuel injection timings and other engine operations can be controlled.

The signal lines preferably are configured with hard-wires or wire-harnesses. However, the signals can also be sent through emitter and detector pairs, infrared radiation, radio waves or the like. The type of signal and the type of connection can be varied between sensors or the same type can be used with all sensors which are described herein. In addition, various intermediate devices can be positioned within the signal lines.

Figure 2:
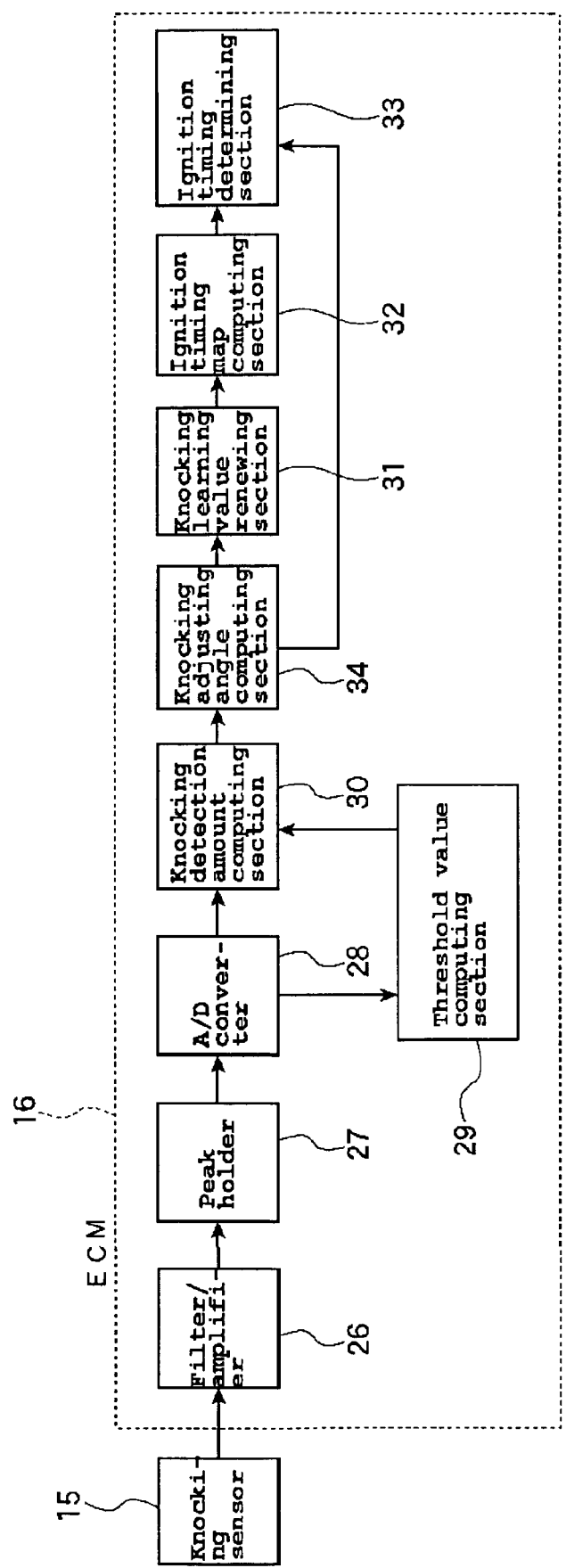
FIG. 2 is a block diagram showing an embodiment of a knocking control device.

A knocking control system, which includes the ECM 16, will now be described with initial reference to FIG. 2. As shown, the knock sensor 15 is connected to the ECM 16. As mentioned above, the knock sensor 15 detects vibration of the engine 1. In the illustrated embodiment, this signal is inputted to a filter/amplifier 26 of the ECM 16 to be amplified with the filter/amplifier 26. A waveform of this amplified signal is held by a peak holder 27, and then the amplified signal is converted to a digital signal from an analog signal by an A/D converter 28.

Figure 6:
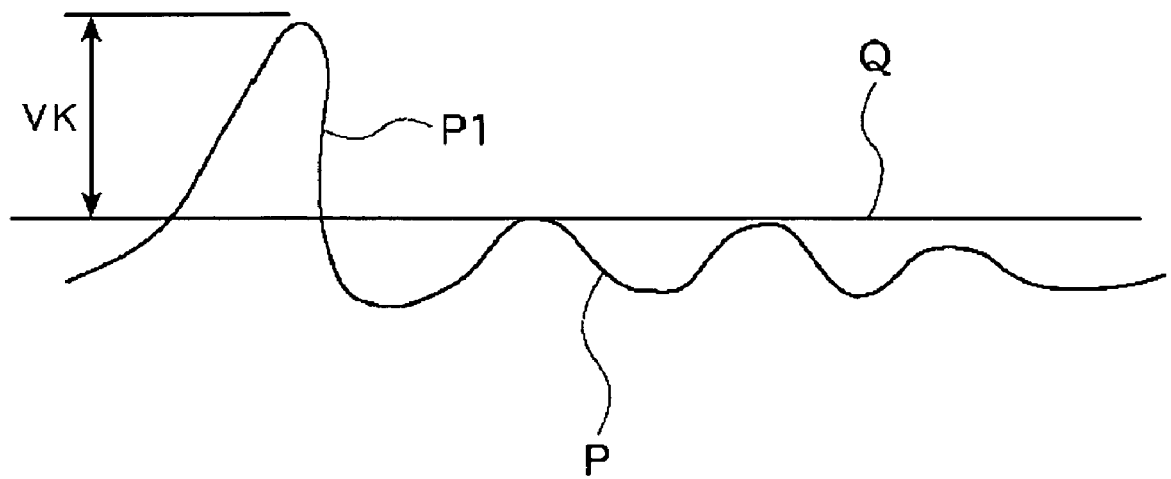
FIG. 6 is an illustration showing an embodiment of a vibration waveform and a threshold value during operation of the engine.

A signal that has a vibration waveform P shown in FIG. 6 is inputted to a threshold value computing section 29 from the A/D converter 28, and a threshold value Q is determined based upon a normal vibration component. A signal of this threshold value Q is inputted into a knocking detection amount computing section 30, and also the signal of the waveform P is directly inputted into the A/D converter 28 from the knocking detection amount computing section 30.

In this knocking detection amount computing section 30, the threshold value Q and the vibration waveform P directly inputted from the A/D converter 28 are compared with each other, and a value Vk of the waveform P1 (knocking detection amount) is computed from the threshold value Q (see FIG. 6). Additionally, although this value Vk is mostly a positive number, a negative number can be computed out.

A signal of the knocking detection amount, which is a result of the computation by the knocking detection amount computing section 30, is inputted into a knocking adjusting angle computing section 34 to compute a knocking adjusting angle, and a signal of this knocking adjusting angle is inputted into an ignition timing determining section 33 and a knocking learning value renewing section 31. The computation of the knocking adjusting angle, which will be described below, can be conducted based upon a flowchart shown in FIG. 3.

In this knocking learning value renewing section 31, a knocking learning value is renewed based upon a signal of the knocking adjusting angle, a signal of the knocking learning value and so forth. The renewal of the knocking learning value, which will be described below, can be conducted based upon a flowchart shown in FIG. 4.

Using an ignition timing map computing section 32, its ignition timing map is computed based upon the knocking learning value. A signal of the ignition timing map is sent to the ignition timing determining section 33 from the ignition timing map computing section 32.

Also, in the ignition timing determining section 33, ignition timing is determined, using an equation shown in FIG. 5, based upon the high octane number ignition timing map, the low octane number ignition timing map, the knocking learning value and the knocking adjusting angle and other parameters. In order to meet the ignition timing, the illustrated embodiment is constructed such that a control signal is outputted to the igniter 17 from the ECM 16, and the ignition timing of each ignition plug 11 is controlled.

The sections (e.g., the knocking adjusting angle computing section 34, the knocking learning value renewing section 31, the ignition timing map computing section 32, and the ignition timing determining section 33) of the ECM 16 can be in the form of a hard-wired circuit, a dedicated processor and memory, or a general purpose processor and memory running one or a plurality of control programs. For easier understanding of the reader, the sections will be described as if they were discriminate and substantial units.

Figure 3:
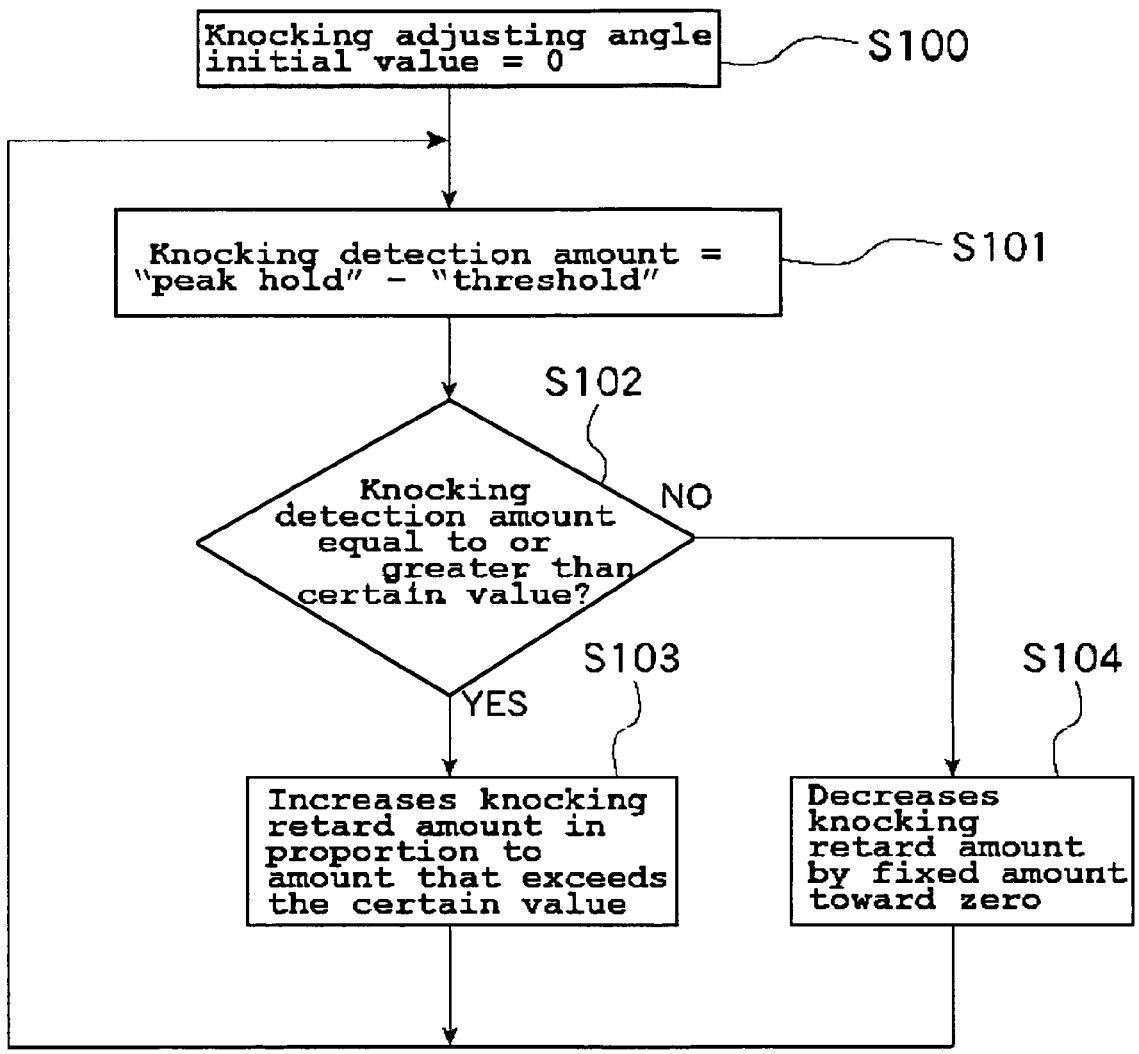
FIG. 3 is an embodiment of a flowchart used for determining a knocking learning value.

FIG. 3 schematically illustrates an exemplary flow chart of a control routine that may be used by the ECM 16 in the knocking adjusting angle computing section 34 to determine the knocking adjusting angle.

Starting from a condition that an initial value of the knocking adjusting angle is zero at a step S100, the ECM 16 proceeds to a step S101 to calculate a knocking detection amount by subtracting a "threshold" from a "peak hold." On this occasion, if the knocking detection amount is greater than zero, knocking is determined. In contrast, if the knocking detection amount is less than zero, knocking is not determined.

Next, at a step S102, the ECM 16 determines whether the knocking detection amount is greater than a certain value (e.g., greater than zero) or not. If the determination is "Yes," the knocking is determined and the ECM 16 proceeds to a step S103. If the determination is "No," the knocking is not determined and the ECM 16 proceeds to a step S104.

At the step S103, because the knocking has occurred, the ECM 16 increases a knocking retard amount in proportion to an amount that exceeds the foregoing certain value (zero), and then returns to the step S101.

Also, at the step S104, because the knocking has not occurred, the ECM 16 decreases the knocking retard amount by a fixed amount toward zero, and then returns to the step S101.

Figure 4:
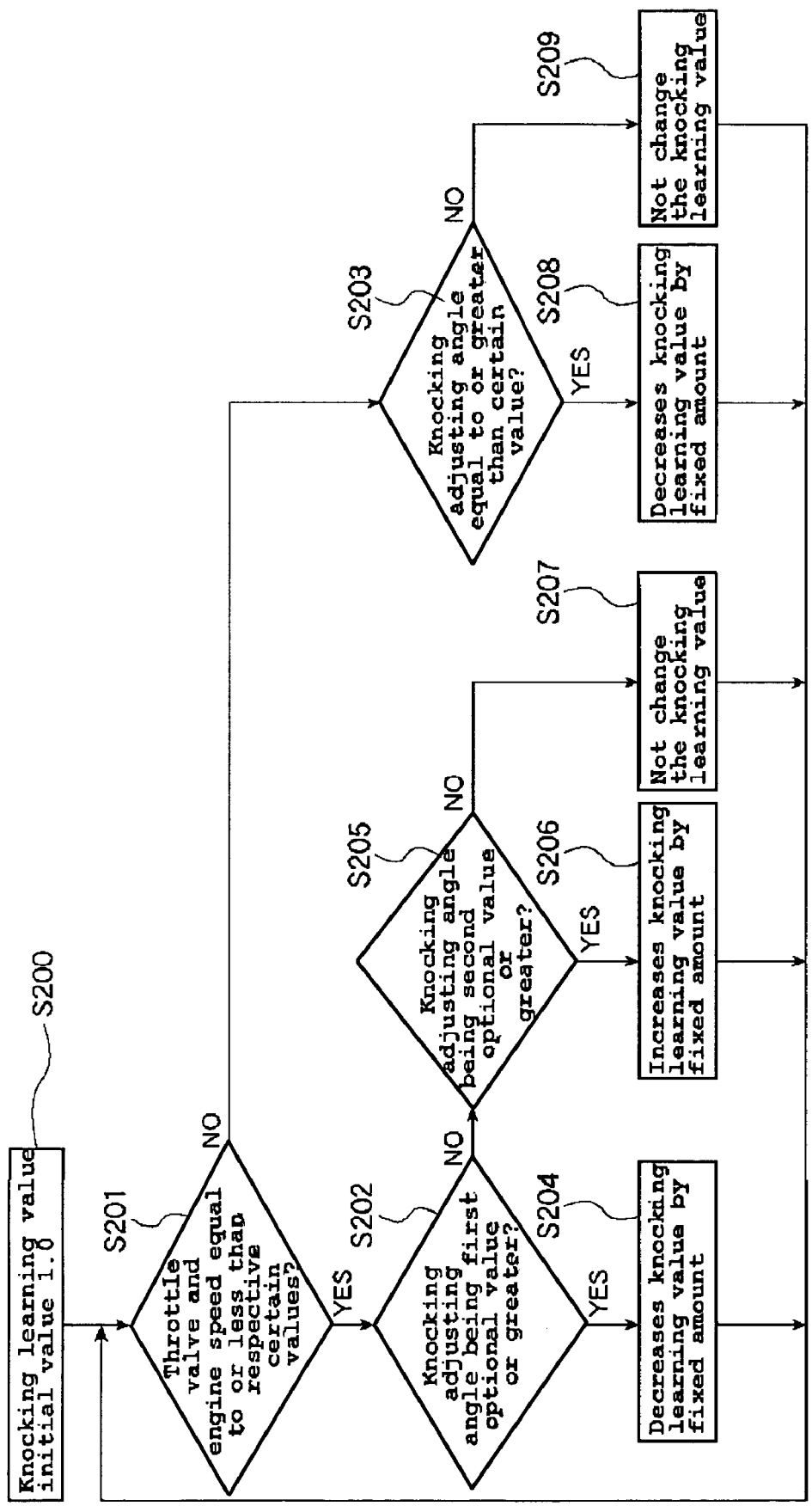
FIG. 4 is an embodiment of a flowchart used for determining a knocking adjusting angle.

FIG. 4 schematically illustrates an exemplary flow chart of a control routine that may be used by the ECM 16 in the knocking learning value renewing section 31 to determine the knocking learning value.

At a step 200, an initial value of the knocking learning value is set to 1.0. In this connection, if the ignition timing for the high octane number occupies 100%, the learning value is 1.0, while, if the ignition timing for the low octane number occupies 100%, the learning value is 0.0.

At a step S201, the ECM 16 determines whether a throttle valve opening and the engine speed are less than respective certain values or not. If the determination is "Yes," the ECM 16 proceeds to a step S202, while, if the determination is "No," the ECM 16 proceeds to a step S203.

To determine an operational condition of the engine, both of the throttle valve opening and the engine speed are used in the embodiment described herein. This advantageously allows for the engine operational condition to be more properly determined. In another embodiment, the engine operational condition can be detected using either the throttle valve opening or the engine speed. In one embodiment, the "certain value" is, for example, a value that indicates an idling operation condition of the engine 1.

At a step S202, the ECM 16 determines whether the knocking adjusting angle computed by the knocking adjusting angle computing section 34 is greater than a first optional value or not. If the determination is "Yes," the ECM 16 proceeds to a step S204, while, if the determination is "No," the ECM 16 proceeds to a step S205.

Because, at the step S204, the ECM 16 determines the condition that the knocking occurs, the ECM 16 decreases the knocking learning value by the fixed amount (changes the knocking learning value toward the low octane number ignition timing map), and then returns to the step S201. At a step S205, the ECM 16 determines whether the knocking adjusting angle computed by the knocking adjusting angle computing section 34 is greater than a second optional value or not. This second optional value is smaller than the first optional value.

If the determination is "Yes" at the step 205, i.e., the knocking adjusting angle is less than the second optional value, the ECM 16 determines that the knocking does not occur, and proceeds to a step S206. The ECM 16 increases the knocking learning value by the fixed amount (changes the knocking learning value toward the high octane number ignition timing map), and then returns to the step S201. Also, if the determination is "No" at the step 205, the ECM 16 proceeds to a step S207, and returns to the step S201 without changing the knocking learning value.

On the other hand, when proceeds from the step S201 to a step S203, the ECM 16 determines whether the knocking adjusting angle is greater than a certain value. If the determination is "Yes," the ECM 16 proceeds to a step S208, while, if the determination is "No," the ECM 16 proceeds to a step S209.

Because, at the step S208, the ECM 16 determines the condition that the knocking occurs, the ECM 16 decreases the knocking learning value by the fixed amount, and then returns to the step S201.

At the step S209, although the knocking does not occur, the ECM 16 returns to the step S201 without changing the knocking learning value. Conventionally, if the ECM 16 determines that the knocking does not occur, the ECM 16 increases the knocking learning value, and the engine speed inevitably fluctuates, accordingly. Herein, however, the ECM 16 inhibits the knocking learning value from changing (stops the change of the knocking learning value toward the high octane number ignition timing map). Thus, the engine speed does not fluctuate.

Figure 7:
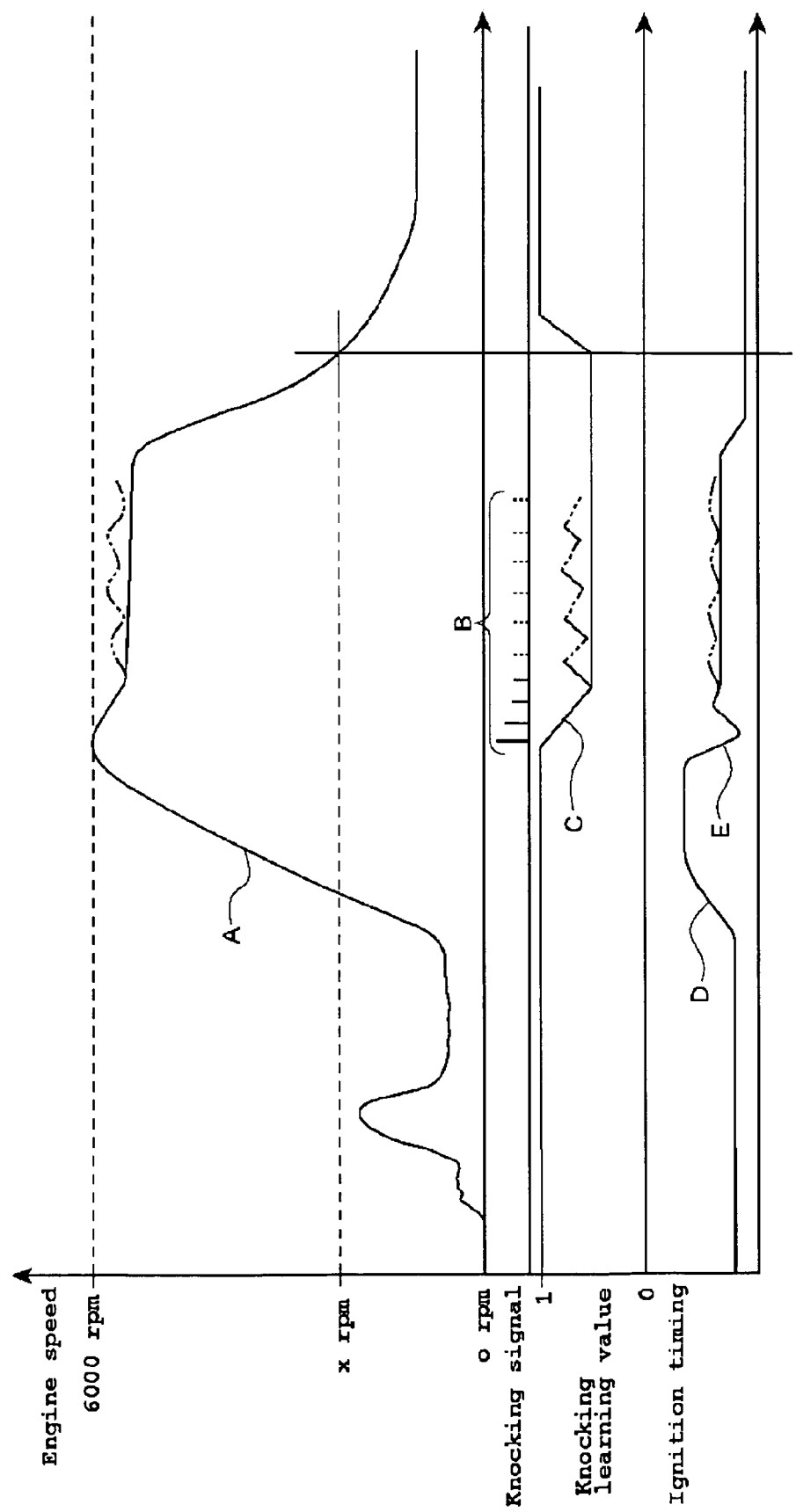
FIG. 7 is a graph showing an engine speed, a knocking signal, a knocking learning value, and an ignition timing during operation of the knocking control device.

FIG. 7 is a graphical illustration of the operation of an outboard motor that utilizes the embodiment of the knocking control system described above. As shown in FIG. 7, when the engine for an outboard motor is started and the engine speed A reaches a condition corresponding to the full throttle operation (e.g., the engine rotational speed reaches 6,000 rpm), if a knocking signal B is detected by the knock sensor 15, the knocking detection amount computing section 30 computes a knocking detection amount. The knocking adjusting angle computing section 34 computes a knocking adjusting angle, and the knocking learning value renewing section 31 decreases the knocking learning value C to a value at which no knocking occurs from "1." Also, at a moment when the knocking learning value C decreases to this value, the knocking learning value C is kept at this value.

This knocking learning value C, which decreases, and the knocking adjusting angle computed by the knocking adjusting angle computing section 34 are put into an equation shown in FIG. 5 so that the ignition timing determining section 33 determines ignition timing D. In FIG. 7, at a portion E, the ignition timing is retarded, then slightly advanced, and settled.

Thereby, the knocking can be prevented from occurring, and the engine speed can be settled through the operation.

To the contrary, conventionally, as indicated by the two-dotted chain line, the knocking learning value is controlled to increase when it decreases to the value at which no knocking can occur, and, as the result of the increase, the knocking learning value again decreases when the knocking occurs, and is controlled to repeat the increase and the decrease. Thus, the ignition timing repeats the advance and the retard as indicated by the two-dotted chain line, and the engine speed also fluctuates as indicated by the two-dotted line, accordingly.

Afterwards, when the engine speed falls lower than X rpm, the knocking learning value increases to be "1" and settled at this value, and the ignition timing is slightly retarded and settled.

As thus described, in the illustrated embodiment of the invention, the knocking learning value renewing section 31 stops the change of the knocking learning value toward the high octane number ignition timing map, when the engine speed is in the vicinity (i.e. close to or at) of the full throttle condition. Thus, when the knocking occurs in the vicinity of the full throttle condition, the knocking learning value is changed toward the low octane number ignition timing map; thereby, the knocking is prevented from occurring. Also, because the change of the knocking learning value toward the high octane number ignition timing map is stopped when the engine speed is in the vicinity of the full throttle condition, the engine speed can be stabilized.

Also, the knocking learning value renewing section 31 allows the knocking learning value to change toward the high octane number ignition timing map, when the engine speed falls lower than a preset value (herein, X rpm). Thus, the knocking learning value that has changed toward the low octane number ignition timing map can be changed toward the high octane number ignition timing map.

That is, if a user notices that the output is restrained due to the fall of the knocking learning value, the user can close the throttle opening toward the idling condition to put the learning value back to "1". Thereby, even though the knocking has occurred before for some reasons, unless any knocking occurs after the user returns the throttle condition to the initial state and again opens the throttle opening to the full throttle condition, the output can return to its initial condition that existed before it had fallen. Thus, any desired output can be obtained.

Further, the knocking adjusting angle computing section 34 is constructed to increase the knocking retard amount in proportion to the magnitude of the knocking when the knocking is detected. Thus, more load is effectively inhibited from being put on the engine.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. For example, various steps in the routines described above may be eliminated, combined and/or rearranged.

Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A knocking control device for a watercraft engine, comprising:
   a knock sensor configured to detect knocking in the engine;
   a knocking learning value renewing section configured to change a knocking learning value toward a low octane number ignition timing map when the knock sensor detects knocking, and to change the knocking learning value toward a high octane number ignition timing map when the knock sensor does not detect a knocking; and
   an ignition timing determining section that is configured to retard or advance an ignition timing based upon the knocking learning value given from the knocking learning value renewing section;
   wherein the knocking learning value renewing section is configured not to change the knocking learning value toward the high octane number ignition timing map when an engine speed is in the vicinity of a full throttle condition.

2. The knocking control device as in claim 1, wherein the knocking learning value renewing section is configured such that the knocking learning value increases toward a high octane number ignition timing map when the engine speed falls lower than a preset value.

3. The knocking control device as in claim 2 additionally comprising a knocking adjusting angle computing section that is configured to retard ignition timing in an amount proportional to a magnitude of the knocking that is detected by the knock sensor.

4. The knocking control device as in claim 2, wherein the preset value corresponds to an idling condition of the engine.

5. The knocking control device as in claim 1 additionally comprising a knocking adjusting angle computing section that is configured to retard ignition timing in an amount proportional to a magnitude of the knocking that is detected by the knock sensor.

6. The knocking control device as in claim 1, wherein the knock sensor comprises a vibration sensor.

7. The knocking control device as in claim 6 additionally comprising a threshold value computing section that is configured to determine a threshold valued based upon a normal vibration condition of the engine.

8. The knocking control device as in claim 7 additionally comprising a knocking detection amount computing section that is configured to compare the threshold value to the detected amount of vibration.

9. The knocking control device as in claim 1, wherein the full throttle condition corresponds to an engine speed that is greater than or equal to 6,000 rpm.

10. The knocking control device as in claim 1, wherein the wherein the knocking learning value renewing section and ignition timing determining section are part of an engine control module of the engine.

11. A method for controlling knocking in a watercraft engine, comprising:
    detecting a knocking in the engine;
    changing a knocking learning value toward a low octane number ignition timing map when knocking is detected;
    when knocking is not detected, changing the knocking learning value toward a high octane number ignition timing map if an engine speed is not in the vicinity of a full throttle condition;
    when knocking is not detected, maintaining the knocking learning value towards the low octane number ignition timing map if the engine speed is in the vicinity of the full throttle condition; and
    retarding or advancing ignition timing based upon the knocking learning value.

12. The method as in claim 11, wherein detecting knocking in the engine comprises sensing vibration in the engine.

13. The method as in claim 11, wherein detecting knocking in the engine comprises determining a threshold value based upon a normal engine condition.

14. The method as in claim 13, wherein detecting knocking in the engine comprises comparing the threshold value to a detected value.

15. The method as in claim 11 additionally comprising increasing the knocking learning value toward a high octane number ignition timing map when the engine speed falls lower than a preset value.

16. The method as in claim 15, wherein the preset value corresponds to an idling condition of the engine.

17. The method as in claim 15 additionally comprising retarding ignition timing in an amount that is proportional to a magnitude of the knocking condition.

18. The method as in claim 11 additionally comprising retarding ignition timing in an amount that is proportional to a magnitude of the knocking condition.

19. The method as in claim 11, wherein the full throttle condition corresponds to an engine speed that is greater or equal to 6,000 rpm.

* * * * *